(12) United States Patent
Xu et al.

(10) Patent No.: US 11,520,812 B2
(45) Date of Patent: Dec. 6, 2022

(54) METHOD, APPARATUS, DEVICE AND MEDIUM FOR DETERMINING TEXT RELEVANCE

(71) Applicant: Beijing Baidu Netcom Science and Technology Co., Ltd., Beijing (CN)

(72) Inventors: Ye Xu, Beijing (CN); Zhifan Feng, Beijing (CN); Zhou Fang, Beijing (CN); Yang Zhang, Beijing (CN); Yong Zhu, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 485 days.

(21) Appl. No.: 16/689,862

(22) Filed: Nov. 20, 2019

(65) Prior Publication Data
US 2020/0242140 A1   Jul. 30, 2020

(30) Foreign Application Priority Data
Jan. 30, 2019   (CN) .......................... 201910093336.X

(51) Int. Cl.
*G06F 7/00*   (2006.01)
*G06F 16/332*   (2019.01)
(Continued)

(52) U.S. Cl.
CPC ......... *G06F 16/3326* (2019.01); *G06K 9/623* (2013.01); *G06N 5/02* (2013.01); *G06V 30/418* (2022.01)

(58) Field of Classification Search
CPC .. G06F 16/3326; G06V 30/418; G06K 9/623; G06N 5/02
(Continued)

(56) References Cited

U.S. PATENT DOCUMENTS

2002/0129015 A1   9/2002   Caudill
2010/0235164 A1   9/2010   Todhunter et al.
(Continued)

FOREIGN PATENT DOCUMENTS

CN   102439595 A   5/2012
CN   103678281 A   3/2014
(Continued)

OTHER PUBLICATIONS

Yin, J. et al., "Neural Generative Question Answering" arXiv preprint arXiv:1512.01337v4 [cs.CL] (Apr. 22, 2016) (12 pages).
(Continued)

*Primary Examiner* — Isaac M Woo
(74) *Attorney, Agent, or Firm* — Nixon Peabody LLP

(57) ABSTRACT

Embodiments of the present disclosure provide a method, apparatus, device and medium for determining text relevance. The method for determining text relevance may include: identifying, from a predefined knowledge base, a first set of knowledge elements associated with a first text and a second set of knowledge elements associated with a second text. The knowledge base includes a knowledge representation consist of knowledge elements. The method may further include: determining knowledge element relevance between the first set of knowledge elements and the second set of knowledge elements, and determining text relevance between the second text and the first text based at least on the knowledge element relevance.

18 Claims, 6 Drawing Sheets

(51) Int. Cl.
*G06K 9/62* (2022.01)
*G06N 5/02* (2006.01)
*G06V 30/418* (2022.01)

(58) Field of Classification Search
USPC .................................. 707/600–899; 704/9
See application file for complete search history.

(56) References Cited

U.S. PATENT DOCUMENTS

| | | |
|---|---|---|
| 2012/0259855 A1 | 10/2012 | Mizuguchi et al. |
| 2017/0228372 A1 | 8/2017 | Moreno |
| 2018/0011927 A1 | 1/2018 | Lee et al. |
| 2018/0255005 A1* | 9/2018 | Agarwal ............. G06F 16/9535 |
| 2018/0276525 A1 | 9/2018 | Jiang |

FOREIGN PATENT DOCUMENTS

| | | |
|---|---|---|
| CN | 105279264 A | 1/2016 |
| CN | 108304381 A | 7/2018 |
| JP | 2006-065387 A | 3/2006 |
| JP | 2018181259 A | 11/2018 |
| KR | 20160120583 A | 10/2016 |
| KR | 10-2017-0107282 A | 9/2017 |
| KR | 10-2018-0004960 A | 1/2018 |

OTHER PUBLICATIONS

Sorokin, D. et al.; "Mixing Context Granularities for Improved Entity Linking on Question Answering Data across Entity Categories"; Ubiquitous Knowledge Processing Lab (UKP) and Research Training Group AIPHES, Department of Computer Science, Technische Universitat Darmstadt; arXiv:1804.08460v1; Apr. 23, 2018 (11 pages).

* cited by examiner

METHOD, APPARATUS, DEVICE AND MEDIUM FOR DETERMINING TEXT RELEVANCE

CROSS-REFERENCE TO RELATED APPLICATIONS

This application claims priority to Chinese Patent Application No. 201910093336.X, filed with the China National Intellectual Property Administration (CNIPA) on Jan. 30, 2019, the content of which is incorporated herein by reference in its entirety.

TECHNICAL FIELD

Embodiments of the present disclosure relate to the field of computer, and more specifically to a method, apparatus, device and computer readable storage medium for determining text relevance

BACKGROUND

Text relevance is also known as matching degree between texts. In many applications, the relevance between different texts needs to be determined. A typical scenario is the search application. Typically, when performing a search, it is necessary to determine the text relevance between the texts in various documents and the text in a search query, and determine the ranking of the documents in returned query results based on the relevance, that is, implementing the ranking based on relevance. The determination of the text relevance is based on an understanding to the text, which is not only related to the semantic similarity between two texts, but also related to the matching degree between the texts. Although a lot of research has been done, current methods for implementing text relevance determination still need to be improved in terms of accuracy.

SUMMARY

Embodiments of the present disclosure provides a solution for determining text relevance.

In a first aspect of present disclosure, a method for determining text relevance is provided. The method includes: identifying, from a predefined knowledge base, a first set of knowledge elements associated with a first text and a second set of knowledge elements associated with a second text, the knowledge base comprising a knowledge representation consist of knowledge elements; determining knowledge element relevance between the first set of knowledge elements and the second set of knowledge elements; and determining text relevance between the second text and the first text based at least on the knowledge element relevance.

In a second aspect of present disclosure, an apparatus for determining text relevance is provided. The apparatus includes: a knowledge element association module, configured to identify, from a predefined knowledge base, a first set of knowledge elements associated with a first text and a second set of knowledge elements associated with a second text, the knowledge base comprising a knowledge representation consist of knowledge elements; an element relevance determination module, configured to determine knowledge element relevance between the first set of knowledge elements and the second set of knowledge elements; and a text relevance determination module, configured to determine text relevance between the second text and the first text based at least on the knowledge element relevance.

In a third aspect of present disclosure, an electronic device is provided. The electronic device includes one or more processor; and a storage apparatus, for storing one or more programs, the one or more programs, when executed by the one or more processors, cause the one or more processors to implement the method according to the first aspect.

In a fourth aspect of present disclosure, a computer readable storage medium is provided. The computer readable storage medium stores a computer program thereon, the program, when executed by a processor, implements the method according to the first aspect.

It should be understood that the content described in the summary of the present disclosure is not intended to limit the key or important features of the embodiments of the present disclosure, nor is it intended to limit the scope of the present disclosure. The following description makes other features of the present disclosure easy to be understood.

BRIEF DESCRIPTION OF THE DRAWINGS

With reference to the accompanying drawings and the following detailed description, the above and other features, advantages and aspects of embodiments of the present disclosure will become more apparent. In the accompanying drawings, the same or similar reference numerals indicate the same or similar elements, in which.

DETAILED DESCRIPTION OF EMBODIMENTS

Embodiments of the present disclosure will be further described below in detail with reference to the accompanying drawings. Although certain embodiments of the present disclosure are shown in the accompanying drawings, it should be understood that embodiments of the present disclosure may be implemented in various forms and should not be construed as limited to the embodiments set forth herein. Instead, the embodiments are provided to provide a more comprehensive and complete understanding of the present disclosure. It may be appreciated that the accompanying drawings and embodiments of the present disclosure are for illustrative purposes only and are not intended to limit the scope of the present disclosure.

In the description of some embodiments of the present disclosure, the term "comprises" and the like are to be understood as open-ended, i.e., "including but not limited to". The term "based on" should be understood as "based at least in part." The term "one embodiment" or "the embodiment" should be understood as "at least one embodiment." The terms "first," "second," and the like may refer to different or identical objects. Other explicit and implicit definitions may also be included below.

As used herein, the term "document" refers to a computer readable file in any format containing text, and also referred to as an electronic document. Examples of a document include hypertext markup language (HTML) files (also known as webpages), word documents, presentation documents, documents in portable document format (PDF), spreadsheet documents, plain text documents, and the like.

Figure 1:
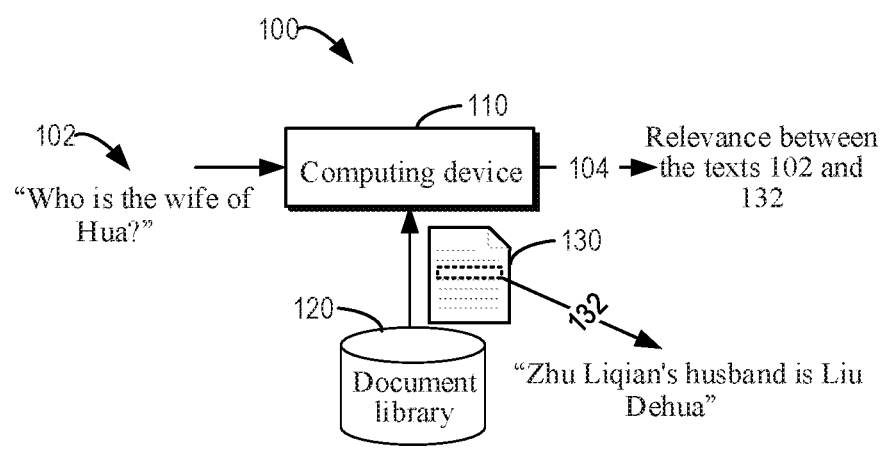
FIG. 1 illustrates a schematic diagram of an example environment for determining text similarity in a conventional scheme.

As mentioned above, in many applications it needs to determine the relevance between texts. FIG. 1 illustrates a schematic diagram of an example environment 100 for determining text similarity in a conventional scheme. In the environment 100, a computing device 110 is configured to determine the relevance between two texts, and the document library 120 is configured to store a plurality of documents, each document having a corresponding text. A text 102 "Who is the wife of Hua?" is provided to the computing device 110 as a search query 102 entered by a user. The computing device 110 then retrieves texts associated with (or matching) the text 102 from the document library 120. For example, the computing device 110 obtains a document 130 from the document library 120 and extracts a portion of the document 130, such as the sentence "Zhu Liqian's husband is Liu Dehua" as a text 132. The computing device 110 then determines the relevance between the texts 132 and 102 as an output 104. In a search query application, the determined relevance may affect whether the document 130 can be presented to the user as a search result for the search query, and/or the ranking of the document 130 in the search result.

In many relevance determination techniques, the co-occurrence at the character or word level between texts is mainly considered, i.e., the occurrence of the same characters or words in two texts. However, it may be difficult for such explicit character or word level information to capture deeper meaning of the text, resulting in unsatisfactory accuracy of relevance determination. In an application considering document ranking, although it is proposed to use the user's skipping relations and the qualities of webpages to rank webpage documents (the typical solution is called "PageRank" model), this solution does not measure the relevance between a webpage and a search query accurately. With the continuous development of deep learning algorithms, it is also proposed to model the problem of text relevance calculation into a classification or ranking problem, manually construct features of different aspects or use algorithms to learn depth features, and then determine the relevance or the matching degree based on the features. However, manually constructing features may be labor intensive, and it is difficult to achieve a deep understanding on a query text, while feature learning at the word level is also faced with solving the problem of accurate text understanding and matching.

According to some embodiments of the present disclosure, an improved text relevance determination solution is presented. In this solution, a knowledge base is introduced to improve the accuracy of relevance determination. Specifically, two texts are associated to corresponding entities in the knowledge base by entity association, and then the text relevance between the texts is determined based on entity relevance between the entities corresponding to the two texts. In this way, the determination of the text relevance may be improved through the relevance at the knowledge element level in the knowledge base.

Figure 2:
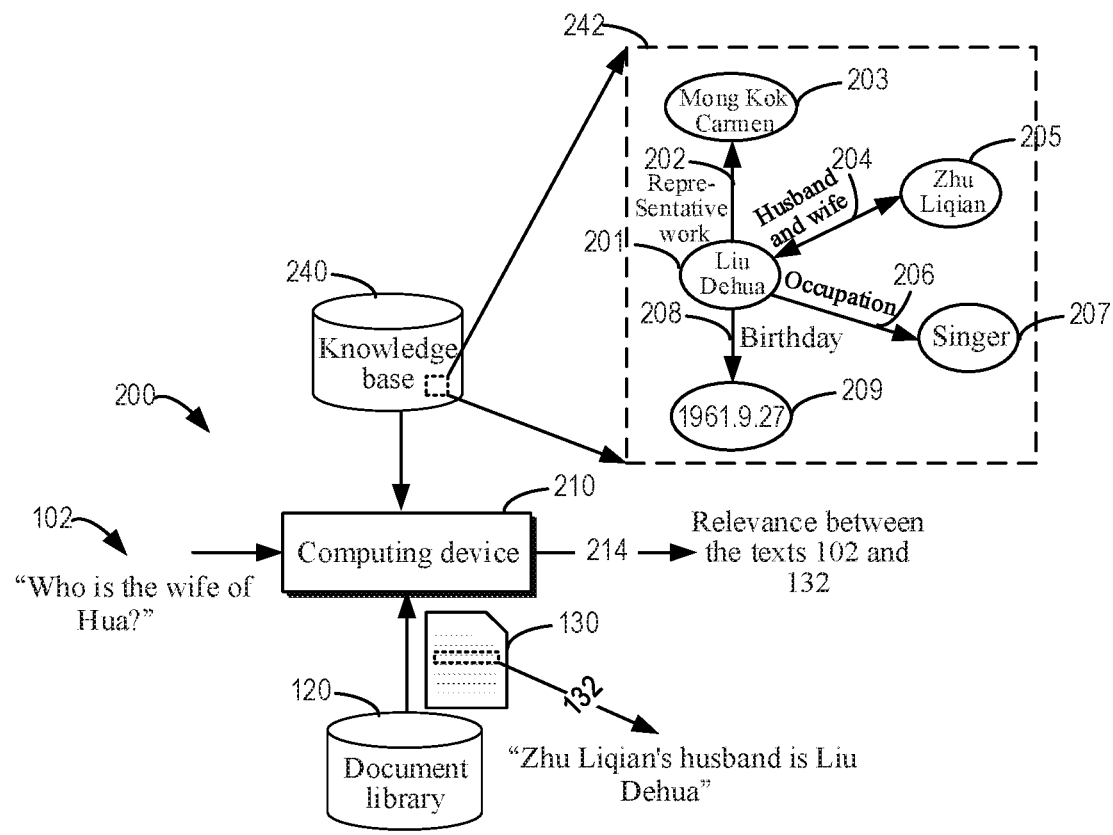
FIG. 2 illustrates a schematic diagram of an example environment for determining text similarity according to various embodiments of the present disclosure.

Embodiments of the present disclosure will be specifically described below with reference to the accompanying drawings. FIG. 2 illustrates a schematic diagram of an example environment 200 for determining text similarity according to some embodiments of the present disclosure. Compared with the environment 100 shown in FIG. 1, a computing device 210 in the environment 200, when determining the text relevance between the text 102 "Who is the wife of Hua?" and the text 132 "Zhu Liqian's husband is Liu Dehua", also refers to the predefined knowledge base 240 to determine the relevance between the texts 102 and 132 at the entity level. It should be understood that although specific contents of the texts 102 and 132 are given in the example of FIG. 2, this is for illustrative purposes only. In other embodiments, the computing device 210 may determine the text relevance between any two texts.

For ease of understanding, the knowledge base 240 is briefly introduced first. The "Knowledge Base" (KB) used in the text is also referred to as "Knowledge Graph" or "mapping knowledge domains", and these terms are used interchangeably herein. A knowledge base is a collection of vast amounts of knowledge. The knowledge base may include a plurality of knowledge elements, and two or more of the knowledge elements constitute a knowledge representation. Examples of knowledge are facts or phenomena such as "Liu Dehua's wife is Zhu Liqian", "Liu Dehua's occupation is a singer", and "Liu Dehua's birthday is Sep. 27, 1961".

In the knowledge base, knowledge elements include entities, relationships between entities, and attributes between entities. As used herein, "entity" refers to various objects or concepts found in the real world, such as persons, geographic locations, organizations, brands, occupations, or dates. In the above examples of knowledge, "entity" includes the persons "Liu Dehua" and "Zhu Liqian", the occupation "singer", and the date "1961.9.27". The term "relationship" as used herein refers to the association between two entities, for example, the relationship between Liu Dehua and Zhu Liqian is husband and wife. The term "attribute" as used herein refers to the nature of the entity itself. Taking a person as an example, its attributes may include occupation, birthday, representative work, age, height, weight, gender, and the like. An attribute of an entity may sometimes be considered a nominal relationship of the entity; therefore, the knowledge base describes one or more relationships of the respective entities.

In order to facilitate the processing of the computer and understanding, the knowledge in the knowledge base may be represented in the form of a triple, such as (first entity, relationship/attribute, second entity). For example, the knowledge "Liu Dehua's wife is Zhu Liqian" may be expressed as a triple (Liu Dehua, Wife, Zhu Liqian). In this text, a relationship or attribute (such as wife) is also referred to as a "predicate", and two entities having a corresponding relationship or attribute may be referred to as "subject" or "object". If an entity is considered as a node, and relationships and attributes between entities are regarded as edges, then a knowledge base containing a large number of triples forms a huge knowledge map. By associating knowledge elements such as entities and relationships/attributes, corresponding knowledge may be easily obtained from the knowledge base.

The knowledge base 240 of FIG. 2 may be any knowledge base that has been or will be developed, examples of which include, but are not limited to, Freebase, DBpedia, YAGO, Open Information Extraction (Open IE), Never-Ending Language Learning (NELL) and the like. Also shown in FIG. 2 is a knowledge portion 240 associated with the entity "Liu Dehua" in the knowledge base 242, in which the relationship/attribute of an entity "Liu Dehua" 201 with other entities is shown. For example, the relationship of that an attribute "representative work" 202 of the entity "Liu Dehua" 201 points to a movie entity "Mong Kok Carmen" 203 is representative work, which indicates the knowledge "Liu Dehua's representative work is Mong Kok Carmen"; the relationship between the entity "Liu Dehua" 201 and a character entity "Zhu Liqian" 205 is "husband and wife" 204, which indicates the knowledge "Liu Dehua and Zhu Liqian are husband and wife"; an "occupation" attribute 206 and a "birthday" attribute 208 of the entity "Liu Dehua" 201 point to an entity "singer" 207 and an entity "1961.9.27" 209, respectively, indicating the knowledges "Liu Dehua's occupation is a singer" and "Liu Dehua's birthday is Sep. 27, 1961". It should be understood that the knowledge portion 242 and its arrangement shown in FIG. 2 are merely one specific example. In other examples, the knowledges associated with the entity "Liu Dehua" may also be arranged differently, and the knowledge base 240 may contain more, less or different knowledges and/or knowledges that are otherwise arranged and presented.

In the knowledge base, different knowledge elements may be assigned corresponding identifiers (IDs) for ease of distinction, and such identifiers are able to uniquely identify corresponding knowledge elements. In addition, each knowledge element may have one or more references (also called names) for indicating the corresponding knowledge element. In the example knowledge portion 242 of FIG. 2, a single reference for each entity, relationship, and attribute is depicted, but one or more elements may have other references. For a knowledge element having multiple references, these references may be synonyms, different names for the same object, and so on. For example, for the entity "Liu Dehua", in addition to the reference "Liu Dehua", there are also other names for the singer, such as the nickname "Hua" and the English name "Andy Lau", may be used as the references of the entity. In some cases, different knowledge elements may also have the same reference. For example, the entity corresponding to the singer Li Na and the entity corresponding to the tennis player Li Na both have the reference "Li Na".

It should be understood that the knowledge base 240 may be stored in any storage system, storage device, or database. Although shown as being separated from the document library 120, the knowledge base 240 may also be stored in the same database as the document library 120. Knowledge in the knowledge base 240 may be expanded continuously, deleted, modified, and/or updated.

According to an embodiment of the present disclosure, the computing device 210 is configured to determine text relevance 214 between the text 102 and the text 132. The determination result of the text relevance 214 may be provided, for example, to other devices for use or storage, presented to the user, and the like. The computing device 210 may also store the determined text relevance 214 locally. The texts 102 and 132 may be text from any source, and respectively consisting of one or more characters, words, and the like. In the example of FIG. 2, the text 102 is included in the user's search query, and the text 132 is part or all of the document 130. In such an example, the document 130 is used as a candidate document for the search query, and the computing device 210 is configured to determine whether the text 132 in the document 130 is related or matched to the text 102 in the search query. The determined level of the text relevance may be used to determine whether may the document 130 be returned to the user as the search result for the search query, and may also determine the ranking of the document 130 in all of the search results. For example, if the level of the relevance between the text 132 the text 102 in the search query is high, then the document 130 may be correspondingly ranked higher in the search results. Through the introduction of the knowledge base, the needs of the querying user may be better understood, thereby returning more matching results.

In some examples, the text 102 includes the entire search query, and the text 132 may include a paragraph, a sentence, or a document fragment that is divided by other granularities of the document 130. The document 130 may be any one of the documents in the document library 120, and the computing device 210 may perform the determination of the text relevance with the text 102 on each of the segments in the document 130, and perform text relevance determination on one or more documents of the document library 120.

In addition to determining text relevance in a search application, the computing device 210 may also determine the text relevance between the text 102 and the text 132 from any two documents. For example, in a document feed application, for example, in an application such as news, hotspot push, or user interest-based recommendation, the relevance between texts in any two candidate documents may be determined. In these applications, both the texts 102 and 132 are from documents, such as may be part (a sentence or a paragraph, etc.) of a document. The determined text relevance or (the overall text relevance of the two documents) may be used to determine the ranking of the two corresponding documents during the document feeding. For example, if it is for diversifying the content feed, the distance between documents having higher text relevance may be increased, thereby enabling the user to obtain more different documents. Alternatively, documents having higher text relevance may also be presented in a centralized way as needed.

Regardless of the source of the texts 102 and 132, when determining the relevance between the two texts, the computing device 210 determines knowledge elements (sometimes referred to herein as "first set of knowledge elements" for ease of description) associated with the text 102 (sometimes referred to herein as "first text" for ease of description) from the knowledge base 240 according to some embodiment of the present disclosure. Similarly, for the text 132, the computing device 210 also determines from the knowledge base 240 knowledge elements (sometimes referred to herein as "second set of knowledge elements" for ease of description) associated with the text 132 (sometimes referred to herein as "second text" for ease of description). As described above, the knowledge elements in the knowledge base may include entities, relationships and/or attributes between entities, and the like. Depending on the contents specifically contained in the texts 102 and 132, the first set and/or the second set of knowledge elements may include one or more entities, relationships between the entities, and/or attributes of the entities and the like.

The process of determining the knowledge elements that appear in a text is also referred to as knowledge element or entity association, link, or annotation, with the objective of identifying whether an object described in the text actually corresponds to a corresponding knowledge element in the knowledge base. The computing device 210 may adopt various association/link/annotation techniques to determine the associations between the knowledge elements in the knowledge base 240 and the texts 102 and 132, and the scope of the embodiments of the present disclosure is not limited in this respect. In the example of FIG. 2, after performing entity association, the computing device 210 may determine that "Hua" and "wife" appearing in the text 102 may be associated with the entity "Liu Dehua" 201 and the relationship "husband and wife" 204 in the knowledge base 240. In addition, it may also be determined that "Zhu Liqian", "husband", and "Liu Dehua" appearing in the text 102 may be associated with the entity "Zhu Liqian" 205, the relationship "husband and wife" 204, and the entity "Liu Dehua" in the knowledge base 240.

The computing device 210 is configured to determine knowledge element relevance between the first set of knowledge elements associated with the text 102 and the second set of knowledge elements associated with the text 132, and to determine the text relevance between the text 132 and the text 102 based at least on the similarity. Since the knowledge elements in the knowledge base have been rationally organized, the disambiguation of the knowledge elements, the relationship/attribute extraction of the knowledge elements, etc., have been realized, the text relevance may be determined more accurately by using the knowledge base. Thus, if the knowledge elements are more similar or have a stronger relevance, it may be indicated that the relevance between the two texts is also higher.

In some embodiments, the knowledge element relevance between knowledge elements may be determined based on custom features extracted according to a predetermined rule, and/or may be determined based on deep learning features extracted by a method of machine learning. In some embodiments, to ensure the stability of an application, such as the application still operates if texts whose relevance is to be determined does not contain any knowledge elements in the knowledge base, the text relevance may also be determined based on the texts 102 and 132 themselves. In this regard, it may also be considered to extract custom features of the texts 102 and 132 according to a predetermined rule, and/or to determine the deep learning features of the texts 102 and 132 by the method of machine learning.

A custom feature refers to a property that is determined according to a simple rule and is to indicate a certain aspect of a knowledge element and/or text. Custom features may also be referred to as shallow features with respect to deep learning features. For the knowledge elements, in some embodiments, the similarity between the first set of knowledge elements associated with the text 102 and the second set of knowledge elements associated with the text 132 may be determined. The similarity indicates a ratio of the first set of knowledge elements and the second set of knowledge elements containing the same knowledge element (e.g., entity, relationship and/or attribute) in the knowledge base 240 and/or using the reference(s) of the same knowledge element. In one embodiment, the computing device 210 may determine the number of knowledge elements in the first set of knowledge elements and the second set of knowledge elements having same identifiers in the knowledge base. Different from the reference of the knowledge element, the identifier of a knowledge element uniquely identifies the knowledge element in the knowledge base, so determining the same knowledge element through same identifier may avoid the accuracy reducing of the relevance determination due to different knowledge elements having the same reference.

The computing device 210 may then determine the similarity between the two sets of knowledge elements based on the number of knowledge elements having same identifiers, for use in determining the knowledge element relevance. The similarity between two sets of knowledge elements may be indicated by the number of the knowledge elements having same identifiers, which may be indicated by: the ratio of the number of knowledge elements having same identifiers to the total number of elements in the first set of knowledge elements, or the ratio of the number of knowledge elements having same identifiers to the total number of elements in the second set of knowledge elements, or the ratio of the number of knowledge elements having same identifiers to the sum of the total number of the elements in the two sets. An example of the similarity between knowledge elements determined based on the ratio of the number of knowledge elements having same identifiers to the total number of elements in the first set of knowledge elements is shown below:

$$Sim1 = \frac{\sum_{id\_q_{i \in [1,n]}} \text{equal}(id\_q_i, \bigcup id\_d_{j \in [1,m]})}{n} \quad \text{Equation (1)}$$

Here, $id\_q_i$ indicates the identifier (ID) of the $i^{th}$ knowledge element in the first set of knowledge elements, and the first set of knowledge elements includes n knowledge elements; $id\_d_j$ indicates the identifier of the $j^{th}$ knowledge element in the second set of knowledge elements, and the second set of knowledge elements includes m knowledge elements; and $$\text{equal}(x, y) = \begin{cases} 1; & \text{if } x = y \\ 0; & \text{if } x \mathrel{!}= y \end{cases}.$$

Equation (1) indicates that for any one of the first set of knowledge elements, it is determined whether there is a knowledge element having the same identifier in the second set of knowledge elements. The ratio of the number of elements having the same identifier in the first set of knowledge elements to the number n of total elements in the first set is then used to indicate the similarity of the knowledge elements, for use in determining the knowledge element relevance. It may be understood that the similarity between the two sets of knowledge elements at the identifier level may also be determined in other methods.

The above uses the unique identifier of a knowledge element to determine whether the first set and the second set of knowledge elements point to same element in the knowledge base 240. Alternatively or additionally, the computing device 210 may determine the similarity between the first set of knowledge elements and the second set of knowledge elements in terms of reference, for use in determining the knowledge element relevance. Specifically, the computing device 210 identifies a first set of text items in the text 102 for being associated to the first set of knowledge elements and a second set of text items in the text 132 for being associated to the second set of knowledge elements, and determines text similarity between the two sets of text items. These text items are text segments for linking from the texts 102 and 132 to the knowledge elements in the knowledge base 240. Each text item may include one or more characters, words, and the like. For example, in the example of FIG. 2, the text items "Hua" and "wife" in the text 102, and the text items "Zhu Liqian", "husband" and "Liu Dehua" in the text 132. These text items are references of corresponding knowledge elements (such as entities, relationships, or attributes), respectively. The computing device 210 may determine the relevance of the two sets of knowledge elements based on the level of the text similarity.

During determining the text similarity, the computing device 210 may determine a first set of text vector representations of the first set of text items, determine a second set of text vector representations of the second set of text items, and then determine a distance between each of the vector representations in the first set of text vector representations and the respective vector representations in the second set of text vector representations. A "vector representation" of a text item may also be referred to as vector encoding or embedding of the text item. The vector representation of each text item may consist of multiple values at certain dimensions. Vector representations of different text items may have identical dimensions, but different values are contained therein. The distance, difference, or similarity between vector representations of text items may also indicate semantic similarity between different text items. By performing processing by mapping text items to vector representations, it may effectively evade the differences between languages and reduce application limitations. Since the text items referred to herein refer to references of certain knowledge elements in the knowledge base 240, in some embodiments, vector representations corresponding to one or more reference of the respective knowledge elements in the knowledge base 240 may be predefined. The computing device 210 may determine the vector representations of the first set and the second set of text items based on a predetermined mapping relationship between the references and the vector representations.

In some embodiments, the first set of text vector representations is took as a base, then a maximum, average or median value of the distances between a text vector representation in the first set and the respective text vector representations in the second set may be determined. The average value is then recalculated based on or a maximum or median value is took from the maximum or average distances determined for all the text vector representations in the first set, for being used as an indication of the similarity between the two sets of text vector representations. The following equation (2) shows an example of determining the text similarity between two sets of text vector representations:

$$Sim2 = \frac{\sum_{mention\_q_{i \in [1,n]}} \max(mention\_q_i, \bigcup mention\_d_{j \in [1,m]})}{n}$$

Equation (2)

Here, mention_$q_i$ indicates the vector representation of the $i^{th}$ text item in the first set of text items (also corresponding to the reference of the $i^{th}$ knowledge element in the first set of knowledge elements), mention_$d_j$ indicates the vector representation of the $j^{th}$ text item in the second set of text items (also corresponding to the reference of the $j^{th}$ knowledge element in the second set of knowledge elements). Equation (2) indicates that for each one of the vector representations in the first set of text items, differences between the vector representation and the vector representations in the second set of text items is determined, and then the maximum difference value is selected. For the vector representations of all text items in the first set of text items, the sum of the selected maximum difference values is counted and averaged over the number of the first set of text items. The averaged value is used as the text similarity between the two sets of text items, for use in determining the knowledge element relevance.

The above discusses the determination of the knowledge element relevance based on the same identifiers of the knowledge elements and/or the text similarity between text items corresponding to knowledge elements. The characteristics on these aspects may be obtained by means of statistics, simple calculations, etc., and thus can become the custom features of the knowledge elements. In other embodiments, as mentioned above, the computing device 210 may alternatively or additionally determine the deep learning features through the machine learning method. Custom features and deep learning features may also be similarly determined for the texts 102 and 132 themselves. The introduction of machine learning tools may involve the training and use of models. To thoroughly illustrate these exemplary aspects, a description will be made with reference to FIG. 3, which illustrates a schematic block diagram of a system 300 for determining text relevance based on a learning network according to some embodiments of the present disclosure.

As used herein, the term "learning network" refers to a model that is capable of learning a mapping relationship between corresponding inputs and outputs from training data, thereby processing a given input based on a parameter set obtained from the training to generate a corresponding output after the training is completed. The "learning network" may sometimes also be referred to as "neural network," "learning model," "network," or "model." These terms are used interchangeably herein.

Figure 3:
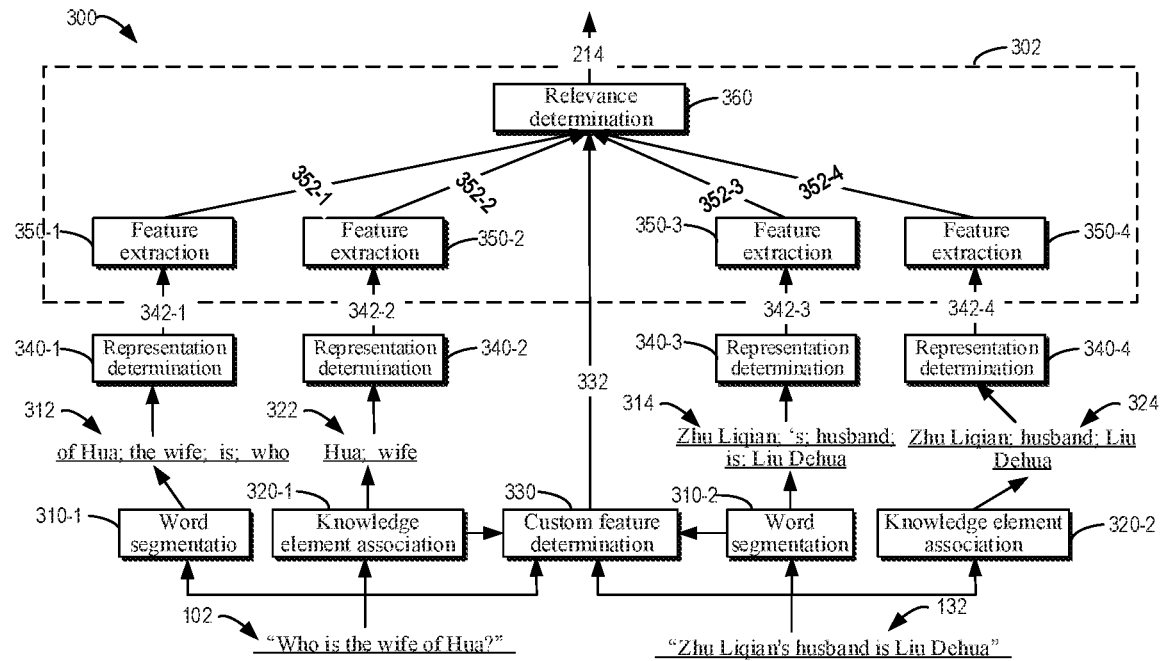
FIG. 3 illustrates a schematic block diagram of a system for determining text relevance based on a learning network according to some embodiments of the present disclosure.

The system 300 shown in FIG. 3 may be implemented in the computing device 210 of FIG. 2. For ease of description, the example architecture of FIG. 3 is described with reference to FIG. 2. The system 300 includes a learning network portion 302, and also includes a processing portion prior to the learning network 302. Specifically, for the texts 102 and 132, word segmentation modules 310-1 and 310-2 (may collectively referred to as word segmentation module 310) are respectively configured to perform word segmentation on the texts 102 and 132, to obtain word segmentation results 312 and 314, where text items are divided by spaces. The word segmentation of the text may be performed using a variety of word segmentation techniques that are currently available or to be developed in the future. In some embodiments, the word segmentation module 310 may also not be used for languages having character delimiters such as English. In some other embodiments, each word or character in the text 102 and/or the text 132 may also be used as an input to a next layer without special word segmentation techniques. The scope of the present disclosure is not limited in this respect.

The system 300 also includes the knowledge element association modules 320-1 and 320-2 (may collectively referred to as knowledge element management module 320) configured to associate the texts 102 and 132 to the knowledge elements in the knowledge base 240, respectively, to obtain association results 322 and 324, which indicate, respectively, that the text 102 is associated to a first set of knowledge elements in the knowledge base 240, namely the entity 201 and the relationship 204, and the text 132 is associated to a second set of knowledge elements in the knowledge base 240, the entity 205, the relationship 204 and the entity 201.

The system 300 includes a custom feature determination module 330 that may be used for determining the shallow custom features between the first set of knowledge elements and the second set of knowledge elements determined by the knowledge element association module 320, including the similarity at the identifier level and the text similarity in terms of reference, used for characterizing the knowledge element relevance between the first set of knowledge elements and the second set of knowledge elements. The similarity of these two aspects may be provided, for example, as a custom feature 332 to a subsequent relevance determination module 360 for determining the text relevance 214 between the text 102 and the text 132.

In addition to extracting custom features associated with knowledge elements, the custom feature determination module 330 may also determine the custom features of the texts 102 and 132 as shallow text relevance. In some embodiments, the custom feature determination module 330 may determine the number or frequency of identical or similar words appearing in the text 102 and the text 132. Similar words may be synonyms, different expressions of the same content (e.g., abbreviations, representations in different languages). Typically, the more that words of the text 102 appear in the text 132, the higher the relevance between the text 132 and the text 102. In some embodiments, the number of identical/similar words appearing in the texts 102 and 132 may be counted, then the ratio of the number to the total number of words in the text 102, the ratio of the number to the total number of words in the text 132, etc. may be determined as the frequency at which the same/similar words appear. In some embodiments, the custom feature determination module 330 may also determine statistical information for the text 102 and/or the text 132 itself, including but not limited to the number of characters, the number of words, source confidence, and the like in the text 102 and/or the text 132, the similarity between the classification of the text 102 and the classification of the text 132, and the like. These statistical information and/or the number and/or frequency of the same/similar words may be provided as the custom feature 332 to the subsequent relevance determination module 360.

Before extracting deep learning features of knowledge elements and/or texts, the knowledge elements and/or texts are typically mapped to vector representations. The system 300 includes representation determination modules 340-2 and 340-4 for determining a first combination vector representations 342-2 corresponding to the first set of knowledge elements (i.e., the association result 322) associated with the text 102, and a second combination vector representations 342-4 corresponding to the second set of knowledge elements (i.e., the association result 324) associated with the text 132, respectively. The system 300 includes representation determination modules 340-1 and 340-3 for determining a first text vector representation 342-1 of the text 102 and a second text vector representation 342-3 of the text 132, respectively, in particular determining the first text vector representation 342-1 and the second text vector representation 342-3 based on the word segmentation results 312 and 314 of the text 102 and 132. For ease of description, the representation determination modules 340-1, 340-2, 340-3, and 340-4 may be collectively referred to as a representation determination module 340.

Figure 4:
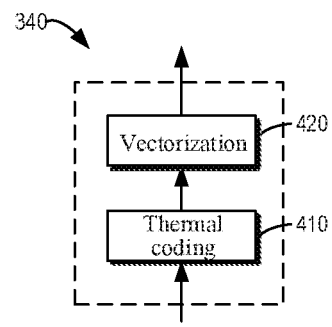
FIG. 4 illustrates a block diagram of an example of a representation determination module in the system of FIG. 3 according to some embodiments of the present disclosure.

Typically, when determining a vector representation, the representation determination module 340 determines the vector representation based on a predetermined mapping relationship. FIG. 4 shows an example of the representation determination module 340. The representation determination module 340 includes a thermal coding module 410 and a vectorization module 420. The thermal coding module 410 is configured to map the input text items (e.g., the text items after the word segmentation in the word segmentation results 312, 314, or the text items corresponding to the references of the knowledge elements in the association results 322, 324) to a thermal code, or one-hot code. The number of the dimensions of the one-hot code is related to the number of different text items in the database or corpus, where the element corresponding to the corresponding text item is marked as 1 and the other elements are marked as zero.

The vectorization module 420 further reduces the one-hot codes of the respective text items output by the thermal coding module 410. Specifically, the vectorization module 420 may be configured as a predetermined vectorization model that indicates a predetermined mapping relationship between an input knowledge element (for the representation determination modules 340-2 and 340-4) or a text item (for the representation determination modules 340-1 and 340-3) and a vector representation, to map the one-hot codes corresponding to the respective knowledge elements and/or text items into predetermined vector representations. The vectorization module 420 may determine the vector representations corresponding to the respective knowledge elements or text items and then combine (e.g., cascade) the individual knowledge elements in the order in which they appear in the corresponding text 102 or 132. For example, for the representation determination module 340-2, the vector representations corresponding to the knowledge elements "Hua" and "wife" may be combined to obtain the first combination vector representations. For the representation determination module 340-4, a second combination vector representations may be similarly determined. For the representation determination module 340-1, the vector representations corresponding to the text items in the segmented word segmentation result 312 may be combined (e.g., cascaded) in the order of the text items in the corresponding text to determine a first text vector representation. Similarly, for the representation determination module 340-1, a second text vector representation may be determined.

In some embodiments, the predetermined mapping relationship (sometimes also referred to as "first predetermined mapping relationship") used by the representation determination module (e.g., the module 340-2 or 340-4) for determining a vector representation of a knowledge element, particularly the vectorization module 420 therein, may be different from the predetermined mapping relationship (sometimes also referred to as "second predetermined mapping relationship") used by the vectorization module 420 in the representation determining module (e.g., the module 340-1 or 340-3) for determining a vector representation of a text.

In some embodiments, the first predetermined mapping relationship realized vectorization at the knowledge element level, implementing the mapping from knowledge elements to vector representations, such that knowledge elements having the same identifier in the knowledge base 240 are mapped to the same vector representation, regardless of the references (such as the corresponding text item in the text) of the knowledge element. In some embodiments, the first predetermined mapping relationship may be determined based on subject-predicate-object (SPO) information of the knowledge elements in the knowledge base 240. Specifically, the TransE model may be used to model the first predetermined mapping relationship, and the modeling method of the model is to make the SPO relationship of the knowledge elements to be valid, for example, may be expressed as S+P=O. The input to the TransE model is a vector representation of the subject (S) and a vector representation of the predicate (P) of a knowledge element, and the output is the vector representation of the object (O). The goal of model training is to make the vector representations of S and P could only equal to the vector representation of O. By constantly training the model, a first mapping relationship may be determined, and the mapping relationship may map each knowledge element to a corresponding vector representation.

In some embodiments, the second predetermined mapping relationship may also be determined based on the SPO information of the knowledge elements in the knowledge base 240. Since the second predetermined mapping relationship is to achieve the mapping from text items to vector representations, it may be determined, for example, using a model such as a continuous bag-of-word (cbow) model. The input to the cbow model is the one-hot codes of a context text item of the central text item, and the output is the one-hot codes of the central text item.

The division of the context text item is defined by a predetermined word window. In some embodiments, due to the SPO information being considered, the distance between a context text item having an SPO relationship with the central text item and the central text item is relatively short, such as at most one text item distance. Therefore, the predetermined word window may be set to be 1. By using the SPO information of the knowledge element, the objective that the vector representations of knowledge elements having the same relationship are closer may be achieved.

It should be understood that only some example embodiments of vector representation determination are given above. In other embodiments, vector representations for knowledge elements and text items may also be determined in other manners. In some embodiments, same mapping relationship may be used to determine vector representations of knowledge elements and vector representations of text items. The embodiments of the present disclosure are not limited in this regard.

Through the representation determination module 340, the text vector representation 342-1 corresponding to the text 102, the combination vector representations 342-2 are provided to the feature extraction modules 350-1, 350-2, respectively, and the text vector representation 342-3 corresponding to the text 132 and the combination vector representations 342-2 and 342-4 are provided to the feature extraction modules 350-3, 350-4, respectively. Feature extraction modules 350-1, 350-2, 350-3, and 350-4 may be collectively referred to as feature extraction module 350 for ease of description. The four feature extraction modules 350 extract features 352-1, 352-2, 352-3, and 352-4 (collectively referred to as features 352) from respective vector representations, respectively. These features are feature representations that are determined after the trained feature extraction module 350 processes the vector representations based on parameters obtained by training. These feature representations are conducive to focus on the feature information of the corresponding knowledge elements and/or text items that help to determine text relevance.

Figure 5:
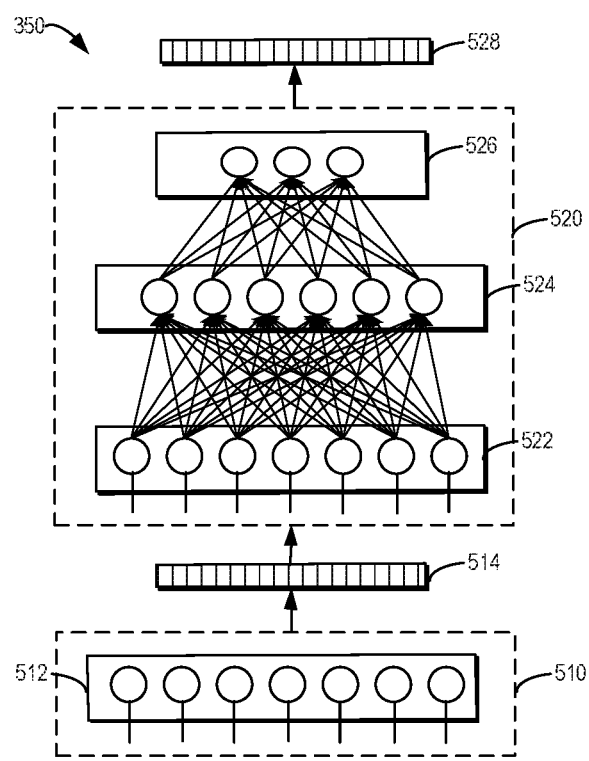
FIG. 5 illustrates a block diagram of an example of a feature extraction module in the system of FIG. 3 according to some embodiments of the present disclosure.

One example of the feature extraction module 350 is shown in FIG. 5. The feature extraction module 350 may include a first network portion 510 that includes one or more recurrent neural network (RNN) layers 512. The use of the RNN layer helps capture the word order of a text. For example, "Who is Xie Tingfeng's son?" and "Whose son Xie Tingfeng is?", these two texts contain same text items, but the meaning of the expressions are completely different, which requires an RNN to help distinguish the changes in text meaning brought by the word orders. The feature extraction module 350 may also include a second network portion 520 for continuing processing an intermediate representation 514 extracted by the first network portion 510 to output a feature 528. The second network portion 520 may include one or more deep convolutional (DNN) layers to enhance the overall feature representation capabilities. Three DNN layers 522, 524, and 526 in the second network portion 520 are shown in FIG. 5. Each network layer may contain a corresponding set of processing units (also referred to as neurons), for processing the inputs based on a feature function and associated parameters and providing the outputs to the next network layer.

It should be understood that the feature extraction module 350 may be configured in any manners, to achieve the purpose of text feature extraction. FIG. 5 only shows one specific example of the feature extraction module 350. In some other embodiments, the feature extraction module 350 may be arranged in different ways, for example, the locations of the first portion 510 and the second portion 520 may be interchanged, more RNN layers, DNN layers, and other network layers may be included, or one or more RNN layers, DNN layers, and the like may not be included.

In some embodiments, parameter sets may be shared between the feature extraction modules 350-1 and 350-3 which is for feature extraction of the text itself (i.e., for feature extraction of the vector representations of the word segmentation results 312 and 314), i.e., same network configuration and values of the parameter set are adopted. In some embodiments, the parameter sets may be shared between the feature extraction modules 350-2 and 350-4 which is for feature extraction of knowledge elements (i.e., for feature extraction of the vector representations of the word segmentation results 322 and 324), i.e., same network configuration and value of the parameter set are adopted. In some embodiments, considering the differences in expressions, terms, and the like between the knowledge elements and the text items, parameters set may not be shared between the feature extraction modules 350-1, 350-3 and the feature extraction modules 350-2, 350-4, i.e., the values of the parameter sets are trained separately. In this case, the network configurations of these feature extraction modules (e.g., the similarity, number, connection method, etc. of the network layers) may be same or may be different. Of course, in some implementations, the four feature extraction modules 350 may be trained to have values of same parameter set.

With further reference to FIG. 3, the features 352 determined by respective feature extraction modules 350 are provided to the relevance determination module 360. The relevance determination module 360, together with the various feature extraction modules 350, constitutes the learning network 302. The shallow feature 332, which is determined by the custom feature determination module 330 and are related to the knowledge elements and/or text itself, together with the features 352 may also be used to determine the text relevance between the texts 102 and 132. The shallow feature 332 from the custom feature determination module 330 may be spliced/cascaded with the features 352 as an input to the relevance determination module 360. In some embodiments, the relevance determination module 360 may process the input (i.e., the cascaded features) based on, for example, a softmax function, to determine the text relevance 104 between the texts 102 and 132. In some embodiments, the text relevance 104 output by the relevance determination module 360 may indicate the level the text 132 matches or is related to the text 102, and/or may indicate an extent to which the two texts are mismatched/unrelated. The feature/similarity or the like obtained based on the knowledge elements may characterize the relevance between the texts 102 and 132 at the knowledge element level. The higher the knowledge element relevance, the higher the text similarity may be indicated.

In some embodiments, for tasks of text relevance, the learning network 302 needs to be trained to determine the values of the parameter sets of the various modules therein. The purpose of the training process is to continuously optimize the parameter set of the learning network from the initial value, to achieve a certain convergence condition (i.e., learning objective). Training of the learning network 302 may be accomplished by the computing device 210, or the learning network 302 may be trained by other devices than the computing device 210 for being used by the computing device 210.

During the training, positive and negative samples may be generated using knowledges in the knowledge base 240 or other knowledge bases, where the positive samples may be queries for the knowledge in the knowledge base 240 and text representations of correct knowledge, and the negative samples may be corresponding queries and text representations of errors or irrelevant indications. During the training, for the feature extraction module 350 that requires parameter set sharing, the parameter update may be performed synchronously.

It should be understood that FIG. 3 illustrates an example of performing custom feature calculation and deep learning feature extraction on both the text itself and the knowledge elements. In some embodiments, one or more of the modules of FIG. 3 may be omitted, for example, the custom features may not be calculated or the depth features may not be extracted for the text 102 and/or 132, and the corresponding processing module may be omitted.

Figure 6:
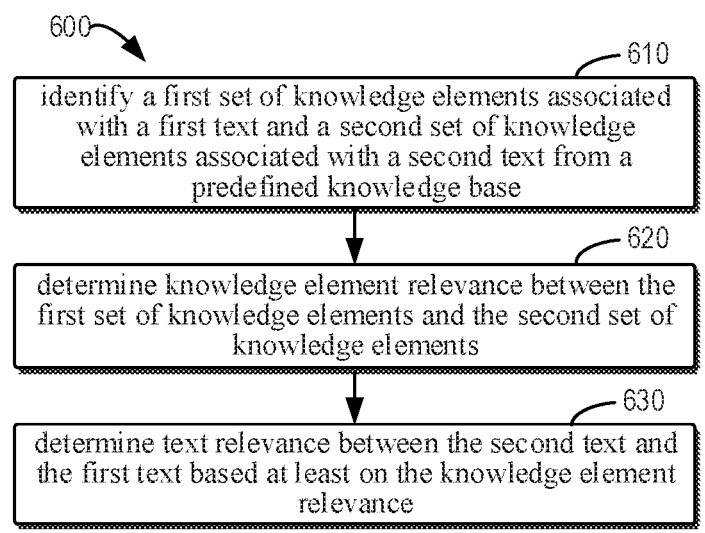
FIG. 6 illustrates a flowchart of a method for determining text relevance according to some embodiments of the present disclosure.

FIG. 6 shows a flowchart of a method 600 for determining text relevance according to some embodiments of the present disclosure. Method 600 may be implemented by the computing device 210 of FIG. 2. For ease of discussion, method 600 will be described with reference to FIG. 2. It should be understood that although shown in a particular order, some of the steps in method 600 may be performed in a different order or in parallel. Embodiments of the present disclosure are not limited in this regard.

At 610, the computing device 210 identifies a first set of knowledge elements associated with a first text and a second set of knowledge elements associated with a second text from a predefined knowledge base. The knowledge base includes knowledge representations consist of knowledge elements. At 620, the computing device 210 determines knowledge element relevance between the first set of knowledge elements and the second set of knowledge elements. At 630, the computing device 210 determines text relevance of the second text and the first text based at least on the knowledge element relevance.

In some embodiments, the first text includes a search query, the second text includes at least a portion of a candidate document, and the relevance is used to determine a ranking of the candidate document in a query result of the search query.

In some embodiments, the first set of knowledge elements or the second set of knowledge elements includes at least one of: entities in the knowledge base, a relationship between the entities, and attributes of the entities.

In some embodiments, determining the knowledge element relevance includes: determining, in the first set of knowledge elements and the second set of knowledge elements, a number of knowledge elements having same identifier in the knowledge base, an identifier of a knowledge element uniquely identifying the knowledge element in the knowledge base; and determining the knowledge element relevance based on the number of the knowledge elements having the same identifier.

In some embodiments, determining the knowledge element relevance includes: determining a text similarity between a first set of text items in the first text for association to the first set of knowledge elements and a second set of text items in the second text for association to the second set of knowledge elements; and determining the knowledge element relevance based on the text similarity.

In some embodiments, determining the knowledge element relevance further includes: determining a first combination vector representations corresponding to the first set of knowledge elements and a second combination vector representations corresponding to the second set of knowledge elements; extracting a first feature of the first combination vector representations and a second feature of the second set of vector representations; and determining the knowledge element relevance based on the first feature and the second feature.

In some embodiments, determining the first combination vector representations and the second combination vector representations includes: determining a first set of vector representations of the first set of knowledge elements and a second set of vector representations of the second set of knowledge elements based on a first predetermined mapping relationship between knowledge elements and vector representations, knowledge elements having the same identifier in the knowledge base in the first set of knowledge elements and the second set of knowledge elements being mapped to a same vector representation; determining the first combination vector representations by combining the first set of vector representations in an order in which the first set of knowledge elements appear in the first text; and determining the second combination vector representations by combining the second set of vector representations in an order in which the second set of knowledge elements appear in the second text.

In some embodiments, the first predetermined mapping relationship is determined based on subject predicate object (SPO) information of the knowledge elements in the knowledge base.

In some embodiments, determining the knowledge element relevance further includes: determining, based on a second predetermined mapping relationship between a text item and a vector representation, a first text vector representation corresponding to the first text and a second text vector representation corresponding to the second text; extracting a third feature of the first text vector representation and a fourth feature of the second text vector representation; and determining the text relevance also based on the third feature and the fourth feature.

In some embodiments, the second predetermined mapping relationship is determined based on subject predicate object (SPO) information of the knowledge elements associated with a text item in the knowledge base.

Figure 7:
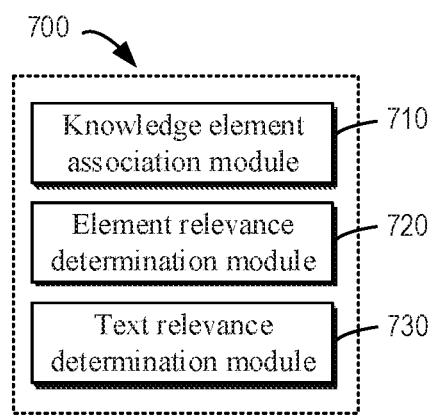
FIG. 7 illustrates a schematic block diagram of an apparatus for determining text relevance according to the embodiments of the present disclosure.

FIG. 7 illustrates a schematic block diagram of an apparatus 700 for determining text relevance according to some embodiments of the present disclosure. The apparatus 700 may be included in the computing device 210 of FIG. 2 or implemented as the computing device 210. As shown in FIG. 7, the apparatus 700 includes a knowledge element association module 710, configured to identify, from a predefined knowledge base, a first set of knowledge elements associated with a first text and a second set of knowledge elements associated with a second text, the knowledge base including a knowledge representation consist of knowledge elements. The apparatus 700 further includes an element relevance determination module 720, configured to determine knowledge element relevance between the first set of knowledge elements and the second set of knowledge elements. The apparatus 700 further includes a text relevance determination module 730, configured to determine text relevance between the second text and the first text based at least on the knowledge element relevance.

In some embodiments, the first text includes a search query, the second text includes at least a portion of a candidate document, and the relevance is used to determine a ranking of the candidate document in a query result of the search query.

In some embodiments, the first set of knowledge elements or the second set of knowledge elements includes at least one of: entities in the knowledge base, a relationship between the entities, and attributes of the entities.

In some embodiments, the element relevance determination module 720 includes: a same identification module, configured to determine, in the first set of knowledge elements and the second set of knowledge elements, a number of knowledge elements having the same identifier in the knowledge base, an identifier of the knowledge element uniquely identifying the knowledge element in the knowledge base; and an identifier based relevance determination module, configured to determine the knowledge element relevance based on the number of the knowledge elements having the same identifier.

In some embodiments, the element relevance determination module 720 includes: a text similarity determination module, configured to determine a text similarity between a first set of text items in the first text for association to the first set of knowledge elements and a second set of text items in the second text for association to the second set of knowledge elements; and a similarity based relevance determination module, configured to determine the knowledge element relevance based on the text similarity.

In some embodiments, the element relevance determination module 720 further includes: a first representation determination module, configured to determine a first combination vector representations corresponding to the first set of knowledge elements and a second combination vector representations corresponding to the second set of knowledge elements; a first feature extraction module, configured to extract a first feature of the first combination vector representations and a second feature of the second combination vector representations; and a feature based relevance determination module, configured to determine the knowledge element relevance based on the first feature and the second feature.

In some embodiments, the representation determination module includes: an individual representation determination module, configured to determine the first set of vector representations of the first set of knowledge elements and the second set of vector representations of the second set of knowledge elements based on a first predetermined mapping relationship between knowledge elements and vector representations, knowledge elements having the same identifier in the knowledge base in the first set of knowledge elements and the second set of knowledge elements being mapped to a same vector representation; a first combination module, configured to determine the first combination vector representations by combining the first set of vector representations in an order in which the first set of knowledge elements appear in the first text; and a second combination module, configured to determine the second combination vector representations by combining the second set of vector representations in an order in which the second set of knowledge elements appear in the second text.

In some embodiments, the first predetermined mapping relationship is determined based on subject predicate object (SPO) information of the knowledge elements in the knowledge base.

In some embodiments, the text relevance determination module 730 further includes: a second representation determination module, configured to determine, based on a second predetermined mapping relationship between a text item and a vector representation, a first text vector representation corresponding to the first text and a second text vector representation corresponding to the second text; a second feature extraction module, configured to extract a third feature of the first text vector representation and a fourth feature of the second text vector representation; and a feature based relevance determination module, configured to determine the text relevance also based on the third feature and the fourth feature.

Figure 8:
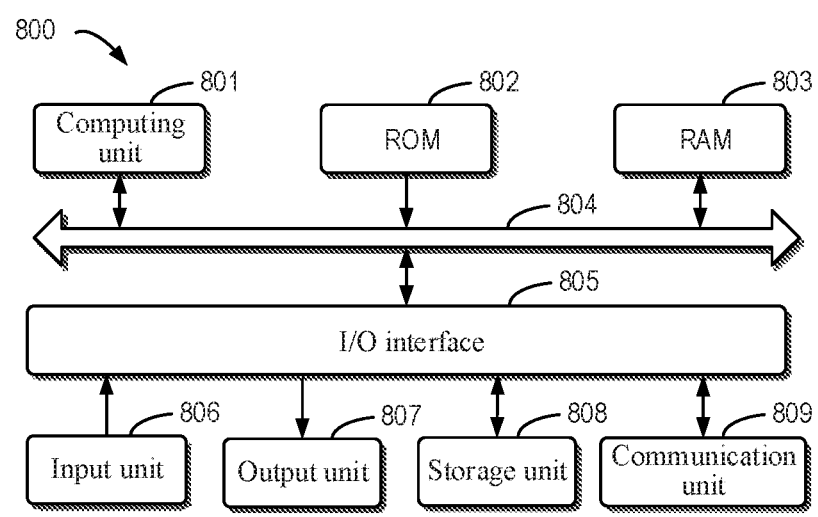
FIG. 8 illustrates a block diagram of a computing device capable of implementing various embodiments of the present disclosure.

FIG. 8 shows a schematic block diagram of an example device 800 that may be used to implement some embodiments of the present disclosure. The device 800 may be used to implement the computing device 210 of FIG. 2. As shown, the device 800 includes a computing unit 801, which may execute various appropriate actions and processes in accordance with a computer program instruction stored in a read-only memory (ROM) 802 or a computer program instruction loaded into a random access memory (RAM) 803 from a storage unit 808. The RAM 803 also stores various programs and data required by operations of the device 800. The computing unit 801, the ROM 802 and the RAM 803 are connected to each other through a bus 804. An input/output (I/O) interface 805 is also connected to the bus 804.

A plurality of components in the device 800 are connected to the I/O interface 805, including: an input unit 806 such as a keyboard, a mouse; an output unit 807, such as various types of displays, speakers; a storage unit 808, such as a magnetic disk, an optical disk; and a communication unit 809, such as a network card, a modem, a wireless communication transceiver. The communication unit 809 allows the device 800 to exchange information/data with other devices through a computer network such as the Internet and/or various telecommunication networks.

The computing unit 801 may be general purpose and/or dedicated processing components having processing and computing capabilities. Some examples of the computing unit 801 include, but are not limited to, a central processing unit (CPU), a graphics processing unit (GPU), various dedicated artificial intelligence (AI) computing chips, various computing units running machine learning model algorithms, a digital signal processor (DSP), and any suitable processors, controllers, microcontrollers, and the like. The computing unit 801 performs the various methods and processes described above, such as the method 600. For example, in some embodiments, the method 600 may be implemented as a computer software program that is tangibly embodied in a machine readable medium, such as the storage unit 808. In some embodiments, some or all of the computer programs may be loaded and/or installed onto the device 800 via the ROM 802 and/or the communication unit 809. When a computer program is loaded into the RAM 803 and executed by the computing unit 801, one or more steps of the method 600 described above may be performed. Alternatively, in other embodiments, the computing unit 801 may be configured to perform the method 600 by any other suitable means (e.g., by means of firmware).

The functions described above herein may be performed, at least in part, by one or more hardware logic components. For example, on a non-limiting basis, exemplary types of hardware logic components that may be used include: Field Programmable Gate Array (FPGA), Application Specific Integrated Circuit (ASIC), Application Specific Standard Product (ASSP), System on System (SOC), Load Programmable Logic Device (CPLD) and the like.

Program codes for implementing the method of the present disclosure may be written in any combination of one or more programming languages. These program codes may be provided to a processor or controller of a general purpose computer, special purpose computer or other programmable data processing apparatus such that the program codes, when executed by the processor or controller, enables the functions/operations specified in the flowcharts and/or block diagrams being implemented. The program codes may execute entirely on the machine, partly on the machine, as a stand-alone software package partly on the machine and partly on the remote machine, or entirely on the remote machine or server.

In the context of the present disclosure, a machine readable medium may be a tangible medium that may contain or store a program for use by or in connection with an instruction execution system, apparatus, or device. The machine readable medium may be a machine readable signal medium or a machine readable storage medium. A machine readable medium may include, but is not limited to, an electronic, magnetic, optical, electromagnetic, infrared, or semiconductor system, apparatus, or device, or any suitable combination of the above. More specific examples of the machine readable storage medium may include electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above.

In addition, although the operations are depicted in a particular order, this should be understood to require that such operations be performed in the particular order shown or in the order of the sequential order, or that all illustrated operations should be performed to achieve the desired results. Multitasking and parallel processing may be advantageous in certain circumstances. Likewise, although several specific implementation details are included in the above discussion, these should not be construed as limiting the scope of the present disclosure. Certain features that are described in the context of separate embodiments may also be implemented in combination in a single implementation. Instead, various features that are described in the context of a single implementation may be implemented in a plurality of implementations, either individually or in any suitable sub-combination.

Although the subject matter has been described in language specific to structural features and/or methodological acts, it should be understood that the subject matter defined in the appended claims is not limited to the particular features or acts described above. Instead, the specific features and acts described above are merely exemplary forms of implementing the claims.

What is claimed is:

1. A method for determining text relevance, the method comprising:
    identifying, from a predefined knowledge base, a first set of knowledge elements associated with a first text and a second set of knowledge elements associated with a second text, the knowledge base comprising a knowledge representation consist of knowledge elements;
    determining knowledge element relevance between the first set of knowledge elements and the second set of knowledge elements; and
    determining text relevance between the second text and the first text based at least on the knowledge element relevance,
    wherein determining the knowledge element relevance further comprises:
    determining a first combination vector representations corresponding to the first set of knowledge elements and a second combination vector representations corresponding to the second set of knowledge elements;
    extracting a first feature of the first combination vector representations and a second feature of the second combination vector representations; and
    determining the knowledge element relevance based on the first feature and the second feature.

2. The method according to claim 1, wherein the first text comprises a search query, the second text comprises at least a portion of a candidate document, and the relevance is used to determine a ranking of the candidate document in a query result of the search query.

3. The method according to claim 1, wherein the first set of knowledge elements or the second set of knowledge elements comprises at least one of: entities in the knowledge base, a relationship between the entities, and attributes of the entities.

4. The method according to claim 1, wherein determining the knowledge element relevance comprises:
    determining, in the first set of knowledge elements and the second set of knowledge elements, a number of knowledge elements having a same identifier in the knowledge base, an identifier of a knowledge element uniquely identifying the knowledge element in the knowledge base; and
    determining the knowledge element relevance based on the number of the knowledge elements having the same identifier.

5. The method according to claim 1, wherein determining the knowledge element relevance comprises:
    determining a text similarity between a first set of text items in the first text for association to the first set of knowledge elements and a second set of text items in the second text for association to the second set of knowledge elements; and
    determining the knowledge element relevance based on the text similarity.

6. The method according to claim 1, wherein determining the first combination vector representations and the second combination vector representations comprises:
    determining a first set of vector representations of the first set of knowledge elements and a second set of vector representations of the second set of knowledge elements based on a first predetermined mapping relationship between the knowledge elements and the vector representations, knowledge elements having a same identifier in the knowledge base in the first set of knowledge elements and the second set of knowledge elements being mapped to a same vector representation;

determining the first combination vector representations by combining the first set of vector representations in an order in which the first set of knowledge elements appear in the first text; and determining the second combination vector representations by combining the second set of vector representations in an order in which the second set of knowledge elements appear in the second text.

7. The method according to claim 6, wherein the first predetermined mapping relationship is determined based on subject predicate object SPO information of the knowledge elements in the knowledge base.

8. The method according to claim 1, wherein determining the knowledge element relevance further comprises:

determining, based on a second predetermined mapping relationship between a text item and a vector representation, a first text vector representation corresponding to the first text and a second text vector representation corresponding to the second text;

extracting a third feature of the first text vector representation and a fourth feature of the second text vector representation; and determining the text relevance also based on the third feature and the fourth feature.

9. The method according to claim 8, wherein the second predetermined mapping relationship is determined based on subject predicate object SPO information of a knowledge element associated with the text item in the knowledge base.

10. A non-transitory computer readable storage medium, storing a computer program thereon, the program, when executed by a processor, implements the method according to claim 1.

11. An apparatus for determining text relevance, the apparatus comprising:

at least one processor; and a memory storing instructions, the instructions when executed by the at least one processor, cause the at least one processor to perform operations, the operations comprising:

identifying, from a predefined knowledge base, a first set of knowledge elements associated with a first text and a second set of knowledge elements associated with a second text, the knowledge base comprising a knowledge representation consist of knowledge elements;

determining knowledge element relevance between the first set of knowledge elements and the second set of knowledge elements; and determining text relevance between the second text and the first text based at least on the knowledge element relevance, wherein determining the knowledge element relevance further comprises:

determining a first combination vector representations corresponding to the first set of knowledge elements and a second combination vector representations corresponding to the second set of knowledge elements;

extracting a first feature of the first combination vector representations and a second feature of the second combination vector representations; and determining the knowledge element relevance based on the first feature and the second feature.

12. The apparatus according to claim 11, wherein the first text comprises a search query, the second text comprises at least a portion of a candidate document, and the relevance is used to determine a ranking of the candidate document in a query result of the search query.

13. The apparatus according to claim 11, wherein the first set of knowledge elements or the second set of knowledge elements comprises at least one of: entities in the knowledge base, a relationship between the entities, and attributes of the entities.

14. The apparatus according to claim 11, wherein the determining the knowledge element relevance comprises:

determining, in the first set of knowledge elements and the second set of knowledge elements, a number of knowledge elements having a same identifier in the knowledge base, an identifier of a knowledge element uniquely identifying the knowledge element in the knowledge base; and determining the knowledge element relevance based on the number of the knowledge elements having a same identifier.

15. The apparatus according to claim 11, wherein the determining the knowledge element relevance comprises:

determining a text similarity between a first set of text items in the first text for association to the first set of knowledge elements and a second set of text items in the second text for association to the second set of knowledge elements; and determining the knowledge element relevance based on the text similarity.

16. The apparatus according to claim 11, wherein the determining the first combination vector representations and the second combination vector representations comprises:

determining a first set of vector representations of the first set of knowledge elements and a second set of vector representations of the second set of knowledge elements based on a first predetermined mapping relationship between the knowledge elements and the vector representations, knowledge elements having a same identifier in the knowledge base in the first set of knowledge elements and the second set of knowledge elements being mapped to a same vector representation;

determining the first combination vector representations by combining the first set of vector representations in an order in which the first set of knowledge elements appear in the first text; and determining the second combination vector representations by combining the second set of vector representations in an order in which the second set of knowledge elements appear in the second text.

17. The apparatus according to claim 16, wherein the first predetermined mapping relationship is determined based on subject predicate object SPO information of the knowledge elements in the knowledge base.

18. The apparatus according to claim 11, wherein the determining the knowledge element relevance further comprises:

determining, based on a second predetermined mapping relationship between a text item and a vector representation, a first text vector representation corresponding to the first text and a second text vector representation corresponding to the second text;

extracting a third feature of the first text vector representation and a fourth feature of the second text vector representation; and determining the text relevance also based on the third feature and the fourth feature.

* * * * *